A. BOECLER.
MACHINE FOR THE PRODUCTION OF RUBBER COATED TEXTILES AND THE LIKE.
APPLICATION FILED SEPT. 14, 1920.
1,406,919.
Patented Feb. 14, 1922.
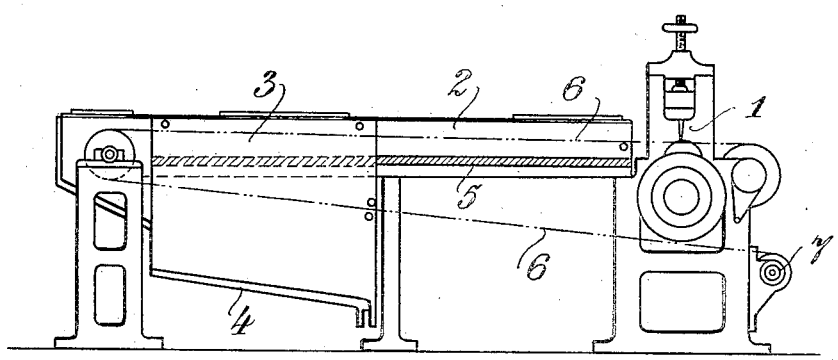
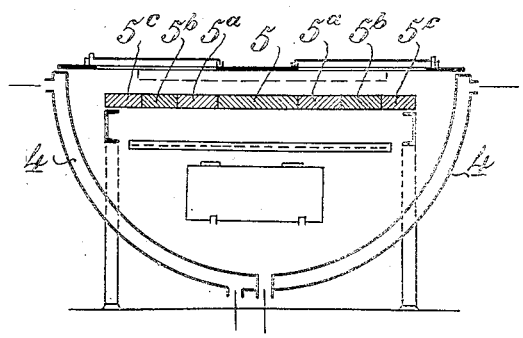
Inventor.
Albert Boecler.

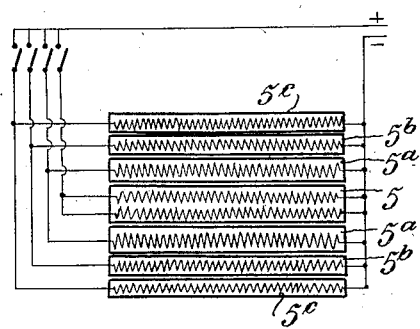
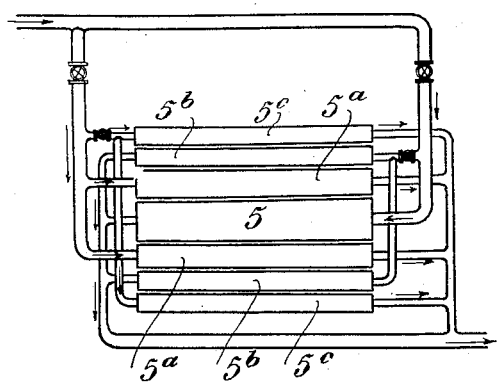

UNITED STATES PATENT OFFICE.

ALBERT BOECLER, OF MALMO, SWEDEN, ASSIGNOR TO BENZINE CONDENSATION CO. INC., A CORPORATION OF NEW YORK.

MACHINE FOR THE PRODUCTION OF RUBBER-COATED TEXTILES AND THE LIKE.

1,406,919. Specification of Letters Patent. Patented Feb. 14, 1922.

Application filed September 14, 1920. Serial No. 410,265.

*To all whom it may concern:*

Be it known that I, ALBERT BOECLER, a citizen of Germany, and residing at Malmo, in the Kingdom of Sweden, have invented a new and useful Improvement in Machines for the Production of Rubber-Coated Textiles and the like, of which the following is a specification.

Such coating machines for rubber solutions and the like are already known, wherein the coated material, f. i. textiles, for the purpose of drying and recovering of the solvent is passed over heating surfaces for evaporation of the solvent, and heretofore such heating surfaces have been heated by means of steam.

This invention refers to a special improvement in such heating surfaces and has for its object to adapt their size after the transverse dimension of the coated material passing above the same, and although the invention may be used irrespective of the nature of the heating medium the same primarily is intended for such heating surfaces, which are heated by electricity. Earlier the heating surfaces in machines of this kind have been of a constant width—approximately the same as the maximum working width of the machine—and of course this fact has caused an unnecessarily great consumption of heat, when the machine is used for smaller widths than the maximum one.

The invention is shown in the accompanying drawings, in which:

Fig. 1 is an elevation partly in section of the improved machine.

Fig. 2 is a transverse section of the same.

Fig. 3 is a diagrammatic view illustrating an electrical means for heating the device.

Fig. 4 is a similar view of a steam means for heating the device.

The main parts of the machine and their arrangement in relation to each other may be considered previously known and in the drawing the reference 1 represents the coating device, 2 the preheating chamber, 3 the evaporating and recovering chamber, which is provided with a cooling jacket 4. Both of said chambers 2 and 3 form together a closed room and within the same a heating plate 5 is arranged, above which the material after having been coated in the apparatus 1 is continuously fed for the purpose of drying, whereafter the same passes to the storage roller 7.

According to the invention the heating plate 5 parallel to the direction of travel of the material 6 is divided in a suitable number of sections 5, $5^a$, $5^b$, $5^c$ (compare Fig. 2), which sections independent of each other may be heated by means of electricity or steam.

The central section 5 has a transverse dimension or width approximately corresponding to the minimum working width coming in question and this section may be the widest one. Of the outer sections those marked with the same reference letters may suitably be of equal width, but sections having different reference letters may differ in relation to each other with regard to the width, for instance in such a manner that the sections arranged nearer to the central one may be broader than sections arranged outside thereof. By this arrangement the heating, as occasion requires, may be regulated according to any working width up to the maximum one, so as to fit the speed of the material 6 passing above the heating surface.

As aforesaid the different sections may be heated independently of each other, but the same may also be combined in such a manner that two corresponding outer sections placed in the same relation to or at the same distance from the central one may be heated simultaneously either by a common valve, if steam is used as heating medium, or by one single switch, if electricity is used.

The use of electrical energy in this connection and for the purpose of heating is to be considered especially suitable, while thereby the controlling possibilities may be effected by means of very simple mechanical devices and besides, when electricity is used for the heating, the greatest economy may be obtained because of the immense scope of controlling possibilities. When starting the machine from a cold condition all of the sections may be put in and when coming into normal action the outer sections may be cut out by and by so as to adapt the effective heating surface to the width of the material passing above the same. Hereby the machine rapidly may be set into normal action when starting and when stopping the quantity of waste heat is not so great as in machines previously known, wherein the whole heating surface irrespective of the working width firstly may be heated uniformly and then kept at a constant temperature all over.

Having now described my invention and the manner, in which the same is to be performed, I declare that what I claim is:—

1. Improvement in machines for the production of rubber coated textiles and the like, having a coating device and a heating plate for the evaporation of the solvent by passing the coated material over the heating plate, said plate being divided in sections parallel to the direction of travel of the material which sections may be heated independently of each other.

2. Improvement in machines for the production of rubber coated textiles and the like, having a coating device and a heating plate for the evaporation of the solvent by passing the coated material over the heating plate, said plate being divided in a number of sections, the central one of which is broader than the sections placed outside thereof said sections being provided with means, whereby they may be heated independently of each other.

3. Improvement in machines for the production of rubber coated textiles and the like, having a coating device and a heating plate for the evaporation of the solvent by passing the coated material over the heating plate, said plate being divided in a number of sections the central one of which being broader than the sections placed outside thereof and said outer sections placed in the same relation to the central section being of the same width, all of the sections being provided with means, whereby they may be heated independently of each other.

4. Improvement in machines for the production of rubber coated textiles and the like, having a coating device and a heating plate for the evaporation of the solvent by passing the coated material over the heating plate, said plate being divided in a number of sections, the central one of which is broader than the sections placed outside thereof, the central section being provided with means, whereby it may be heated independently of the outer sections, and the outer sections placed in the same relation to the central one being combined in pairs and provided with common means for each pair, whereby such a pair of sections may be heated independently of the other.

5. Improvement in machines for the production of rubber coated textiles and the like, having a coating device and a heating plate for the evaporation of the solvent by passing the coated material over the heating plate, said plate being divided in a number of sections parallel to the direction of travel of the material and heated by means of electricity, the central section being of a transverse dimension greater than the same dimension of the outer sections and said outer sections placed in the same relation to the central one being of the same transverse dimension and combined in pairs, each of which is provided with common means, whereby such a pair of sections may be heated independently of the other ones and of the central section.

6. Improvement in machines for the production of rubber coated textiles and the like, having a coating device and a heating plate for the evaporation of the solvent by passing the coated material over the heating plate, said plate being divided in a central section and an equal number of outer sections placed on each side of the central one, all of said sections being heated by means of electricity and the outer sections being combined in pairs and provided with common means for each pair, whereby such a pair of sections may be heated independently of the other ones and of the central section.

In testimony whereof, I have signed my name to this specification in the presence of two subscribing witnesses.

ALBERT BOECLER.

Witnesses:
 ERNST BESSON,
 PAGE LANZOW.